United States Patent [19]
Kuwabara et al.

[11] Patent Number: 5,243,691
[45] Date of Patent: Sep. 7, 1993

[54] SYSTEM FOR PRINTING DOCUMENTS

[75] Inventors: Tadashi Kuwabara; Keiichi Nakane; Hiroyuki Koreeda; Naomichi Nonaka; Kazunari Suzuki, all of Yokohama; Kiyoshi Masuda, Hitashi, all of Japan

[73] Assignees: Hitachi, Ltd., Tokyo, Japan; Hitachi Microsofyware Systems, Inc., Yokohama, Japan

[21] Appl. No.: 624,474

[22] Filed: Dec. 10, 1990

Related U.S. Application Data

[63] Continuation of Ser. No. 63,115, Jun. 17, 1987, abandoned.

[30] Foreign Application Priority Data

Jun. 18, 1986 [JP] Japan ................... 61-140128

[51] Int. Cl.⁵ ............................................... G06F 1/00
[52] U.S. Cl. ..................... 395/112; 395/117; 395/106; 345/133
[58] Field of Search ............ 364/518, 517; 340/717, 340/724, 734, 748, 747; 395/112, 117, 106, 115

[56] References Cited

U.S. PATENT DOCUMENTS

| | | | |
|---|---|---|---|
| 4,110,823 | 8/1978 | Cronshaw et al. | 364/200 |
| 4,149,145 | 11/1979 | Hartke et al. | 340/739 |
| 4,591,845 | 5/1986 | Komatsu et al. | 340/745 |
| 4,639,721 | 1/1987 | Eto et al. | 340/747 |
| 4,668,995 | 5/1987 | Chen et al. | 358/282 |
| 4,672,459 | 6/1987 | Kudo | 358/257 |
| 4,695,976 | 9/1987 | Nakanishi et al. | 364/900 |
| 4,698,624 | 10/1987 | Barker et al. | 340/709 |
| 4,827,249 | 5/1989 | Chauvel et al. | 340/703 |
| 4,829,470 | 5/1989 | Wang | 364/900 |
| 4,843,538 | 6/1989 | Lane et al. | 364/188 |
| 4,956,806 | 9/1990 | Crowe et al. | 364/900 |
| 5,008,854 | 4/1991 | Maeda et al. | 364/900 |
| 5,025,399 | 6/1991 | Wendt et al. | 364/519 |

FOREIGN PATENT DOCUMENTS

| | | |
|---|---|---|
| 0002133 | 5/1979 | European Pat. Off. |
| 0173965 | 3/1986 | European Pat. Off. |
| 0266911 | 5/1988 | European Pat. Off. ............ 364/518 |
| 0157343 | of 1982 | Japan . |
| 0119432 | 7/1984 | Japan ................... 364/519 |
| 0171256 | 9/1984 | Japan ................... 364/519 |
| 0195737 | 11/1984 | Japan ................... 364/519 |

OTHER PUBLICATIONS

Goldwasser et al. "Page Composition of Continuous Tone Imagenary" IEEE 1982, pp. 411–418.
Compact 5.25-Inch Disk Drive with Large Capacity 8297 Hitachi Review vol. 36 (1987) No. 4, Tokyo, Japan.

*Primary Examiner*—Phu K. Nguyen
*Attorney, Agent, or Firm*—Antonelli, Terry, Stout & Kraus

[57] ABSTRACT

Edited data for text, patterns, graphs, and the like can be provided by editing programs dedicated to edition of each of such data. A system for editing and printing documents includes a plurality of printing program each corresponding with each of the editing programs and operating independently of one another for generating graphics commands in accordance with the edited data a printing control program for generating print images composed of dots in accordance with the graphics commands from the printing programs and a printing management program for controlling operations of the printing programs in accordance with data in a control data file which stores therein data related to printing programs such as print positions of individual edited data. The system also provides an operating system capable of multitask control, which controls a printing conditions set up program independently of the operation of the printing management program, whereby printing requests are enabled to be received in succession if such requests are made in the course of printing.

10 Claims, 9 Drawing Sheets

SYSTEM FOR PRINTING DOCUMENTS

This application is a continuation of application Ser. No. 063,115, filed Jun. 17, 1987, now abandoned.

BACKGROUND OF THE INVENTION

The present invention relates to a system such as a word processor for editing and printing a document and more particularly to a printing system fit for printing a document which includes text, patterns, graphs, etc.

Word processors hitherto in use were, in many cases, executed by a packaged program with both editing process and printing process combined therein.

If a text editing program and a pattern editing program are considered, each of them had its own editing process program and printing process program. In such case, it was impossible for some pattern data edited by a pattern editing program to be printed by a text editing program. Conversely, it was impossible for some text data edited by a text editing program to be printed by a pattern editing program.

Recently, there has been an increasing demand for a system that can edit and print a document with text, patterns, and other such elements integrated therein. To meet the demand, there are some text editing programs provided with pattern and graphic processing functions, but their performance compares very poorly to packaged programs dedicated to processing of patterns or graphics.

While there has been the need for an economical document processing system making use of abundant functions of dedicated packages to process text, patterns, graphs, etc. for editing and effectively printing such data on a single sheet of paper in a given format, however processing programs in conventional word processors have not been adapted for edition and printing of such documents.

There is a system proposed in the publication of Japanese Patent Laid-open No. 57-157343/1982 which divides one page into logical areas and thereby makes it possible to print a plurality of output contents in one page. But this system prints a one-page image in an area, without any concept of an integrated document being involved, and its object was to reduce the consumption of recording paper.

The prior art greatly contributed to the improvements of the functions of editing programs, but efforts for such improvement have been separately directed to each of the different types of programs namely text, patterns, etc. Although the editing function of each of the different types of programs has been highly developed, such a situation is brought about that it is now very difficult to incorporate these individual editing programs into a united program capable of editing and printing a document, in view of complexity and capacity of these programs and their data structures.

SUMMARY OF THE INVENTION

An object of the present invention is the provision of a system for printing documents capable of utilizing data edited by individual programs (for text, the patterns, etc.) as they are and effectively printing the results edited by these individual programs on the same paper according to layout data.

Another object of the present invention is the provision of a system for printing documents having a system structure capable of utilizing existing editing programs having abundant editing functions, and requiring virtually no need for alteration.

A further object of the present invention is the provision of a system for printing documents capable of receiving requests for printing other documents, and thereupon, establishing printing conditions therefor, even in the course of printing a document.

In order to achieve the above enumerated objects, the present invention, in a system for printing documents provided with an operating system capable of multitask control, constitutes a system for printing documents of plural printing programs corresponding with each of the editing programs for editing text, patterns, graphs, etc. and operating independently of one another for issuing graphics commands according to the edited data edited by such editing programs, printing control means for generating print images composed of dots according to the graphics commands from such plural printing programs, a control data file having data relative to the printing programs such as print position data of individual edited data, and printing management means controlling operations of the plural printing programs according to the data in the control data file. Further, the system of this invention is provided with printing conditions set up means which receives printing requests independently of the printing process by the printing management means and sets up data about printing conditions such as range for printing and number of copies, whereby the printing data set up in response to the printing requests are linked to a queue.

The program as the printing management means obtains layout data for the recording paper from the document control data. The layout is given as an assemblage of rectangular areas, one of the rectangular areas corresponding to a set of edited data. The printing management program starts the printing program corresponding to the edited data and the printing program generates a graphics (printing) command from the edited data. The graphics command is a command provided by a printing control program in the OS for spreading the print image on a memory.

The printing management program spreads the edited data corresponding to all the rectangular areas into a print image by starting the respective printing programs and outputs the same to a wire dot printer or laser beam printer.

The printing programs are very small in scale because they only generate the graphics commands from their respective edited data. Since it is not necessary to operate two or more printing programs at the same time, the program area of the memory can be made to be not so large by arranging such that the program is rolled in from the hard disk to the memory when it is executed.

DETAILED DESCRIPTION OF THE PREFERRED EMBODIMENTS

Preferred embodiments of the present invention will be described below in detail referring to the accompanying drawings.

Figure 1:
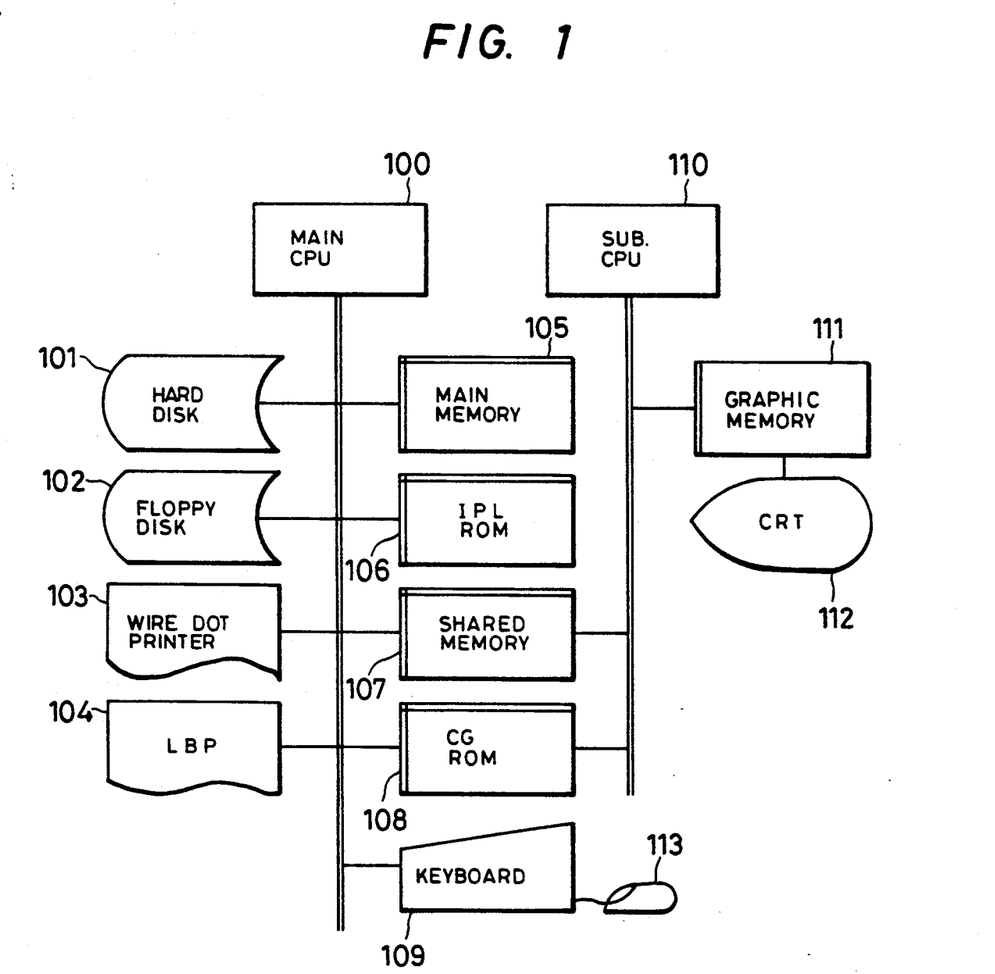
FIG. 1 is a block diagram showing an embodiment of general arrangement of a system for printing documents of the present invention.

FIG. 1 shows an embodiment of a hardware structure to which a system for printing documents of the present invention is applied. Reference numeral 100 denotes a microprocessor dealing with edition and printing of documents and will hereinafter be called the main CPU. Reference numeral 110 denotes a processor for spreading such as characters and lines on a graphic memory 111 according to a command from the main CPU 100 and will hereinafter be called the sub CPU. The spread results are displayed on a CRT 112. The main CPU 100 and the sub CPU 110 communicate with each other through a shared memory 107. Programs to be executed by the sub CPU 110 are stored in the shared memory 107. Programs to be executed by the main CPU 100 include resident programs which are constantly stored in a main memory 105 and non-resident programs normally stored in a hard disk 101 as an external memory and rolled in to the main memory 105, and rolled out from the main memory 105 to the hard disk 101, according to the need. Reference numeral 108 denotes a CG ROM (Read Only Memory) 108 storing therein the font of the characters used for printing and display and accessible by both the main CPU 100 and the sub CPU 110. Reference numeral 102 denotes a floppy disk for storing therein documents written by the user and the operational environment. Commands for edition and printing and inputting of documents are executed through a keyboard 109 and a mouse 113. Reference numerals 103 and 104 denote printers, and in the present embodiment is shown an example of the system supporting two kinds of printers, a wire dot printer 103 which is low in speed but inexpensive and a laser beam printer (hereinafter to be called the LBP) 104 which is higher in speed. Reference numeral 106 denotes an IPL (initial program loader) ROM.

Figure 2:
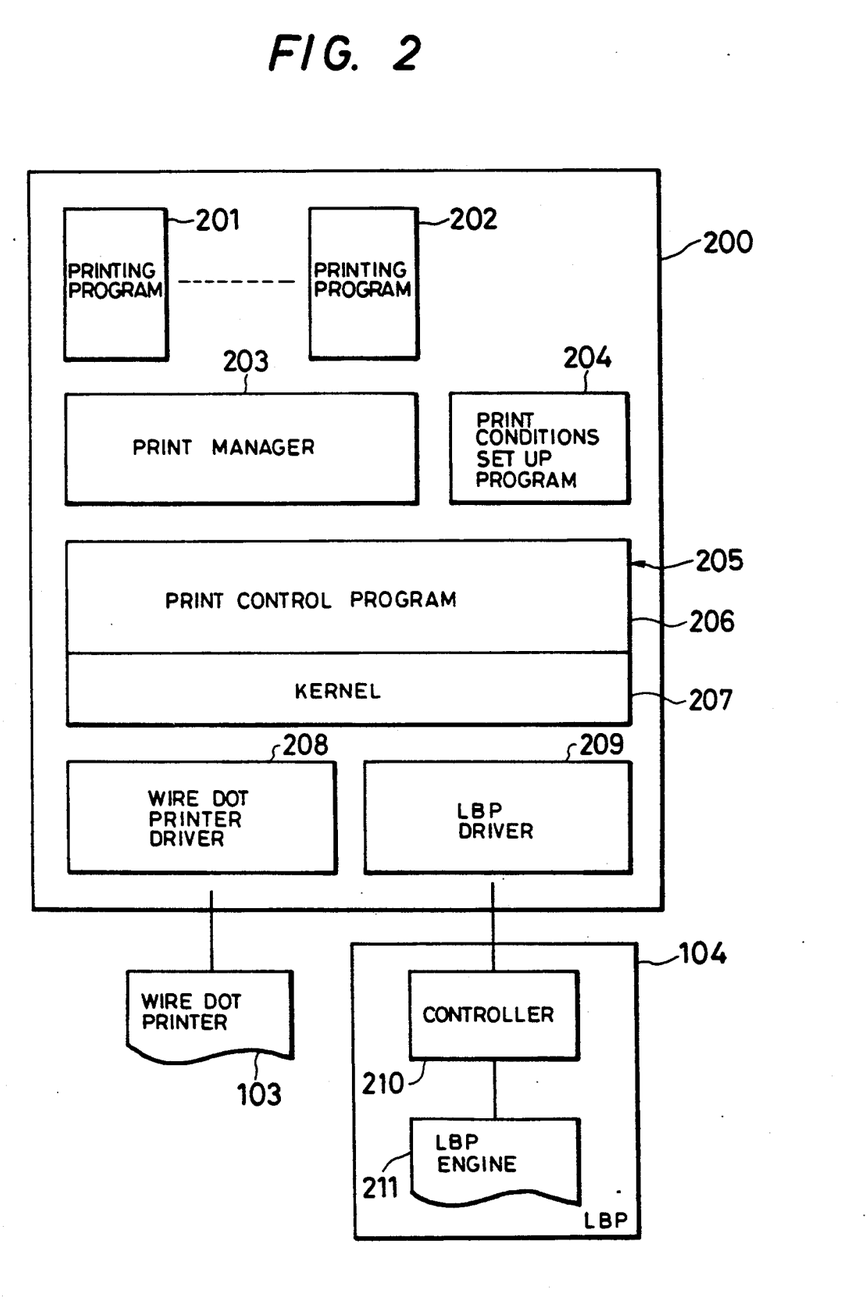
FIG. 2 is a diagram schematically showing program groups relative to the printing process in the main CPU in the system for printing documents of the present invention shown in FIG. 1.

FIG. 2 shows a software structure of the system for printing documents of the present invention. Reference numerals 201 and 202 denote printing program groups depending on each of the applications for either text, patterns, graphs, etc. Although only two of them are shown in the figure, various printing programs such as will deal with text, patterns, graphs, tables, English text, columned descriptions, images, etc. can be contemplated. These printing programs, according to data of the corresponding editing programs, generate printing commands prepared by an OS (operating system) which will be described below. Reference numeral 203 denotes a printing management program controlling the order of execution of the printing programs. Reference numeral 204 denotes a printing conditions set up program which starts the printing management program 203 upon inputting printing conditions. Each of the above mentioned programs 201-204 is controlled as an independent task by the OS 205. The OS 205 is separated into a kernel 207, which performs basic task control, input and output control, and the like, and a printing control program 206, which performs such functions characteristic of a printing process as generation of images composed of dots from the above mentioned printing command. The printing control program 206 provides the programs 201-204 with a high degree of printing process function. The printing programs 201-202 each generate graphics commands such as text draw, straight line draw, and circle commands from the data of the editing programs. According to such commands, the printing control program 206 spreads the image composed of dots on a desired printing buffer. Reference numeral 208 denotes a wire dot printer driver and reference numeral 209 denotes an LBP (Laser Beam Printer) driver. These respectively control the wire dot printer 103 and the LBP 104. The LBP 104 is made up of an LBP engine 211 performing an actual printing operation and a controller 210, which controls the LBP engine 211, communicates with the word processor 200, and converts the printing data transferred from the word processor 200 into the form to be printed by the LBP engine 211.

As also described previously, FIG. 2 is a diagram showing the software structure necessary for the printing process according to the present invention. Therefore, although the word processor 200 includes various other programs for editing and the like, such programs are omitted in the diagram.

Figure 3:
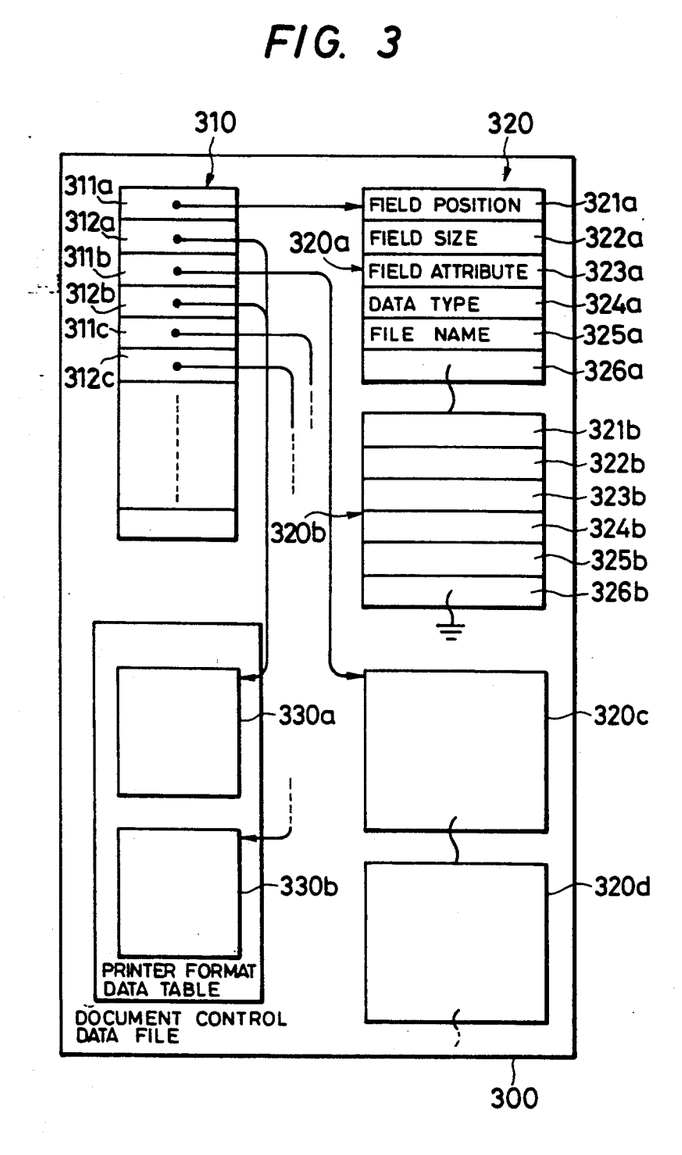
FIG. 3 is a schematic diagram showing structure of a document control data file in the system for printing documents of the present invention shown in FIG. 1.
Figure 4:
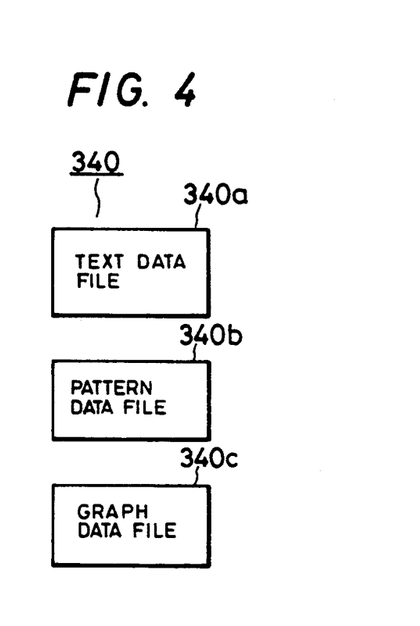
FIG. 4 is a schematic diagram showing structure of a field data file in the system for printing documents of the present invention shown in FIG. 1.

Now, referring to FIG. 3 and FIG. 4, arrangement of the data files necessary for embodying the present invention will be described. Data files for one document are made up of a document control data file 300 as shown in FIG. 3 and field data files 340 (text data file 340a, pattern data file 340b, graph data file 340c, etc.) edited by individual printing programs. Data in the field data files 340 have the same data structure as data edited by conventional application programs. The document control data file 300 is composed of a page control table 310, field control block 320, and a printer format data table 330. The page control table 310 and the field control block 320 are the data that are newly provided in this invention. These data become data relative to their respective printing programs 201 and 202. The page control table 310 is made up, for each page, of list headers 311 indicating the heads of lists of the field control blocks 320 included in the page and pointers 312 pointing to the printer format data table. The field control block 320 is composed of such items as field position 321, field size 322, field attribute 323, data type 324, field data file name 325, and pointer 326 which points to next field.

Figure 5:
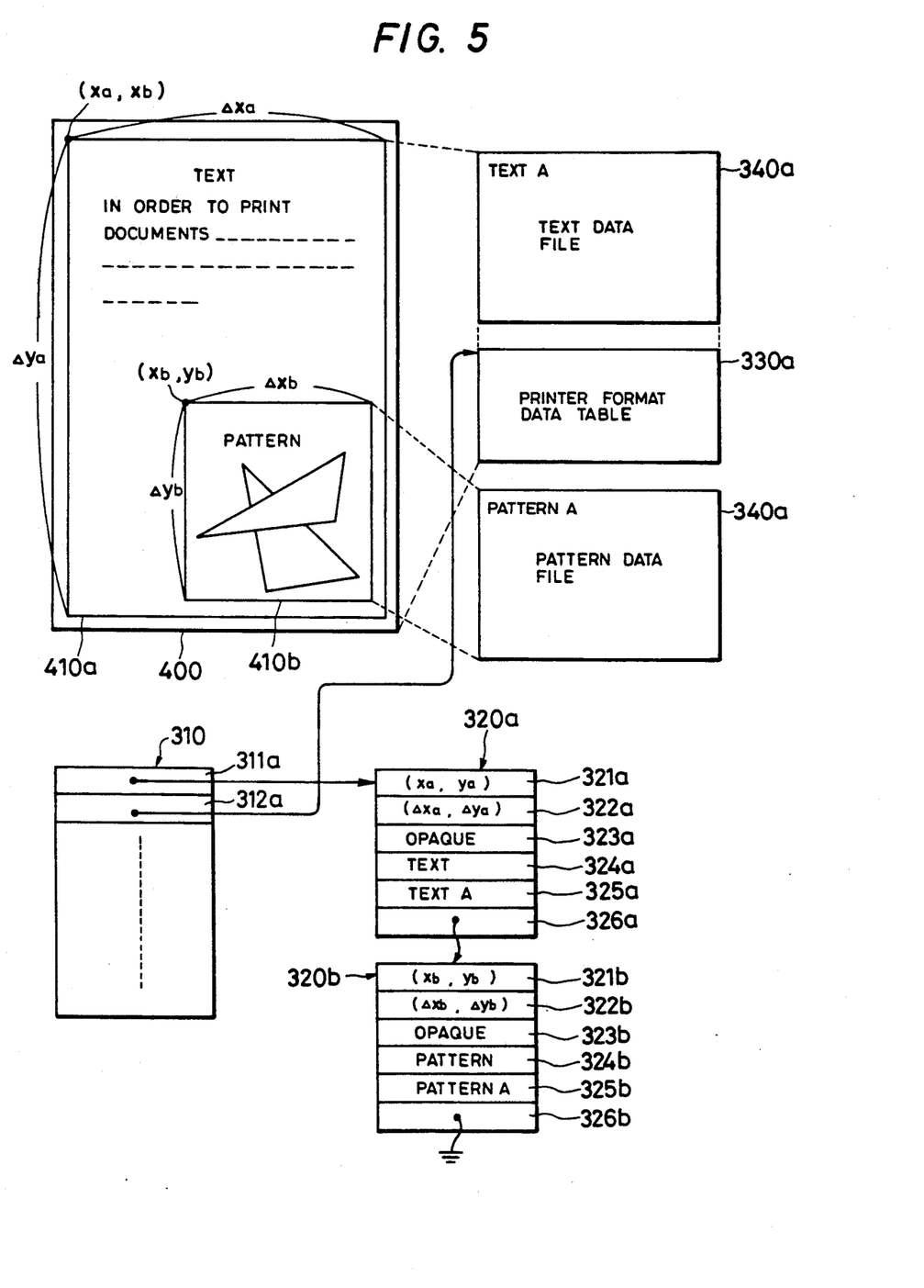
FIG. 5 is a schematic diagram showing relationship between a print image in one page and the data files shown in FIGS. 3 and 4 in the system for printing documents of the present invention shown in FIG. 1.

FIG. 5 is a diagram for describing the relationship between the print image in one page and the document control data file 300 plus field data files 340. Reference numeral 400 denotes a one-page print image, and the document in the present example is provided with a text and a pattern integrated therein. The one-page area is defined as an assemblage of one or more image fields 410 and to each image field is allocated a printing program. The data edited by each of the printing programs are the data to be printed in each of the fields and stored in the field data files 340a, 340b. The field control blocks 320a, 320b correspond to the fields 410a, 410b. Position (xa, ya) and size Δxa, Δya of the field 410a in the figure are stored in the entries 321a, 322a in the field control block, respectively. As to the pattern field 410b, its position (xb, yb) and size Δxb, Δyb are stored in the entries 321b, 322b in the field control block, respectively. Since the entry 323b in the field control block 320b is opaque, the field under the field 410b is not visible. That the data type of the field 410b is a pattern and its file name is "Pattern A" is apparent from the entries 324b, 325b. The data in the field 410a are stored in the file by the name of "Text A", but in the case of text data like the field 410a, a printer format data table 330a becomes necessary, in addition to the field data file 340a, for the dot spread of the print image. The printer format data table 330a stores therein data for the one page such as row pitch, character pitch, and row form.

Figure 6:
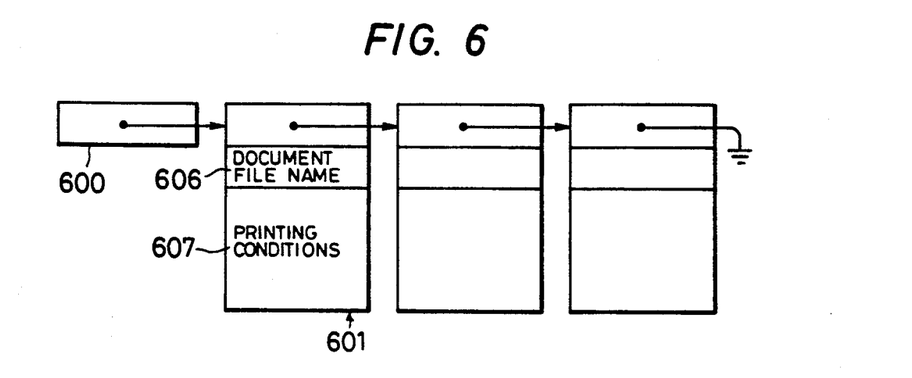
FIG. 6 is a diagram showing a queue of printing control blocks commonly accessible by a printing conditions set up program and a printing management program in the system for printing documents of the present invention shown in FIG. 1.
Figure 8:
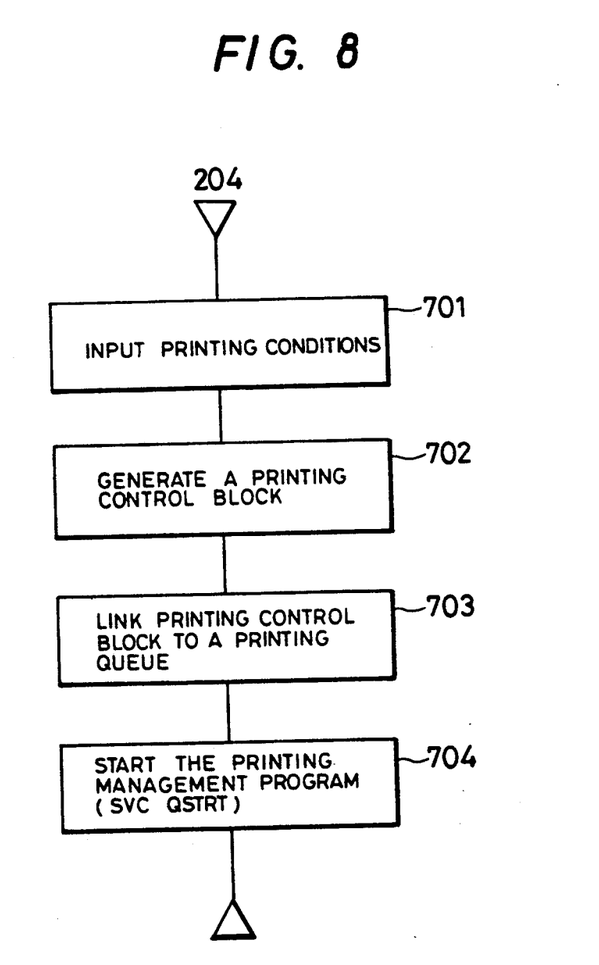
FIG. 8 is a flow chart showing an embodiment of the printing programs set up program shown in FIG. 2.

Now, description will be made on an embodiment of the system for printing documents of the present invention which employs the above described system arrangement and data arrangement. When a request is made for a printing process, the printing conditions set up program 204 is started with the document name to be printed taken as the parameter. A flow chart of the process performed by the printing conditions set up program 204 is shown in FIG. 8. The printing conditions set up program 204 first prompt the user to set up the range for printing, whether or not the page numbers are to be printed, number of copies, etc., and generates a printing control block 601 as shown in FIG. 6 according to the input values by the user (process in steps 701 and 702 in FIG. 8). The thus generated printing control block 601 is linked to the header 600 of the printing queue as shown in FIG. 6 (step 703 in FIG. 8). In the printing control block 601 is written the file name 606 of the document as the object of printing in addition to the printing conditions 607. These are called the printing data. The document file name 606 is nothing but the name of the document control data file 300. The printing conditions set up program 204 starts the printing management program 203 and finishes its processing (step 704 in FIG. 8). As the method for the starting up, a task start macro (QSTRT as one of the supervisor calls (SVC)) is employed. The above mentioned printing queue is formed in the main memory 105 in FIG. 1, which is not only accessible by the printing conditions set up program 204 but also by the printing management program 203.

Figure 7:
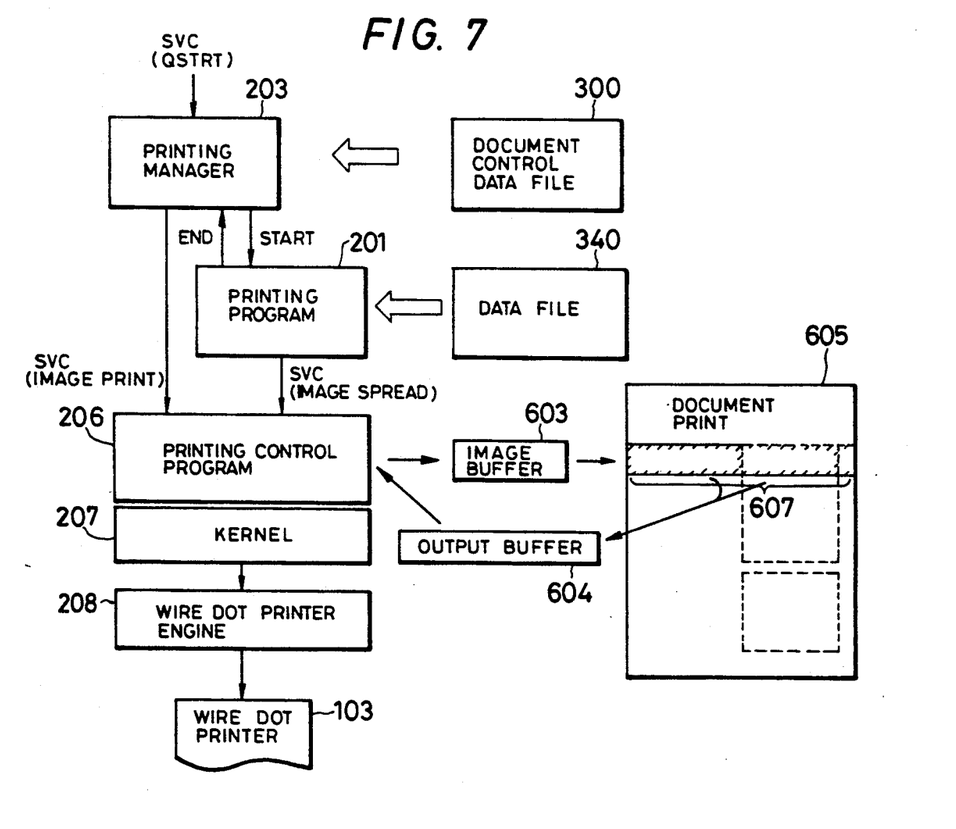
FIG. 7 is a schematic diagram describing operations of the program groups relative to the printing process shown in FIG. 2.

FIG. 7 is a diagram describing the outline of the flow of the process in the case where a wire dot printer 103 is used as the printer, wherein, however, the printing conditions set up program 204 is omitted. First, outline of the printing process will be described with reference to this diagram, and thereafter, the process in each program will be described in detail referring to FIG. 9 and FIG. 10.

The printing management program 203 upon being started by the printing conditions set up program 204 reads out the document control data file 300 based on the document file name 606 of the printing control block 601 linked to the printing queue, and, according to its contents, starts an appropriate printing program 201. The printing program 201 reads out the data file 340 according to the file name specified by the printing management program 203 and issues a printing command (SVC Image Spread) to the printing control program 206.

Figure 11A:
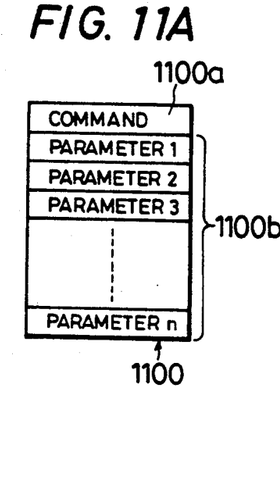
FIG. 11A, 11B, and 11C are diagrams schematically showing printing commands.
Figure 11B:
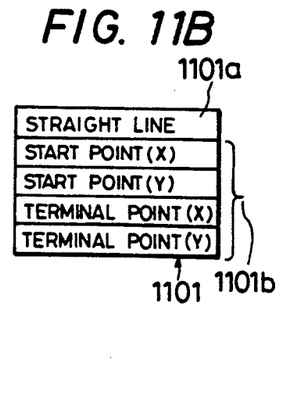
Figure 11C:
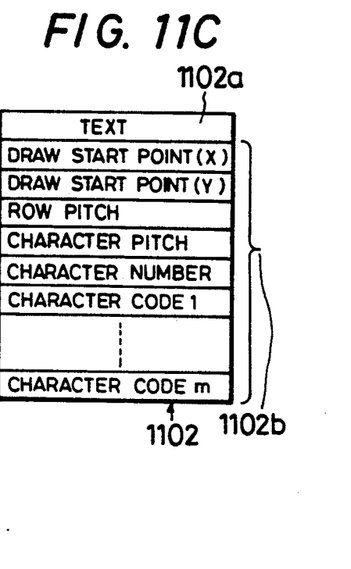
Figure 12:
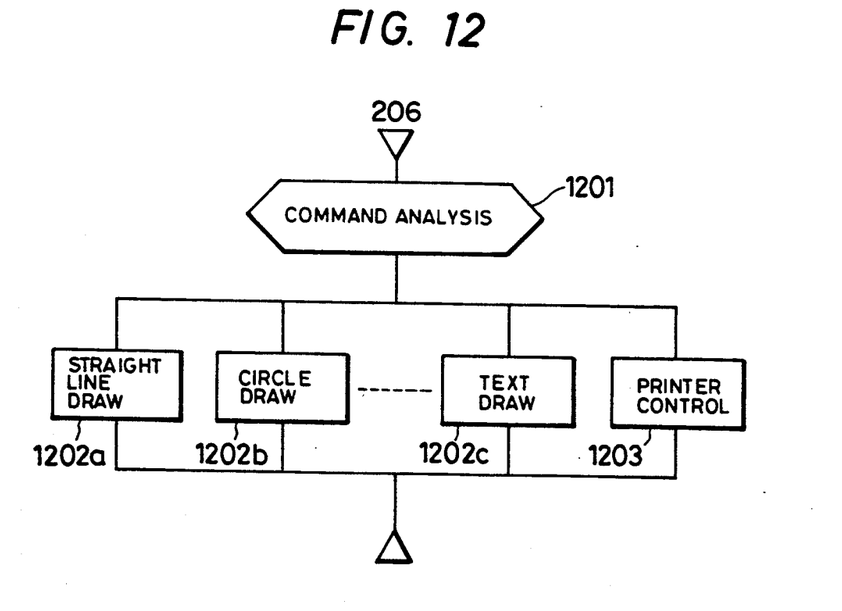
FIG. 12 is a flow chart showing an embodiment of the printing control program shown in FIG. 2.

The printing command is, as shown by reference numeral 1100 in FIG. 11A, composed of a command 1100a and parameters 1100b. For example, in the case of straight line draw, the graphics command as one type of printing command is composed, as shown by reference numeral 1101 in FIG. 11B, of a command 1101a indicating the straight line and four parameters 1101b representing start point (x), start point (y), terminal point (x), and terminal point (y). Reference numeral 1102 in FIG. 11c denotes a command for a text draw. The printing control program 206, as shown in FIG. 12, analyzes the command (1201) and calls a subroutine 1202, or 1203 corresponding to the command. In the case where the command is for a straight line draw, for example, the printing control program 206 calls the straight line draw routine 1202a in the figure and draws a straight line on a given image buffer 603 (FIG. 7). The printing control program 206 spreads the print image 605 for one page according to the commands which come in in succession, but since it is impossible to spread on the memory the whole image for one page at a time, the print image is spread on the hard disk 101 (FIG. 1). The printing commands include, in addition to the graphics command, a printer control command for controlling the outputting of an image and the feeding paper to the printer. The printing control program 206, upon receipt of the printer control command, calls a printer control routine 1203 and performs control of the printer 103 through the wire dot printer driver 208.

The printing program 201, when the image spread on its own field has been ended, informs the printing management program 203 of the fact that it has been ended by way of the message communication provided by the OS as shown in FIG. 7. Since the printing management program 203 has been ready for receiving a message since it started the printing program 201, the printing management program 203 receives the message and starts the next printing program 201 and then returns to the waiting state for a message. Thus, when the print image has been spread on the whole field of one page, the printing management program 203 issues the printing control program 206 a request for printing the image (SVC Image Print). The print image on the hard disk 101 is read by the output buffer 604 one line (607) at a time and transferred through the wire dot printer driver 208 to the wire dot printer 103 to be printed thereby. When the printing of one page has been finished, the printing management program 203 starts printing of the next page.

If a request for printing is made during the above described printing process, the printing conditions set up program 204 is started again without suspending the printing process. The printing conditions set up program 204 in response to the new printing request allows the printing conditions to be input, generates a printing control block 601, and links the same to the tail of the printing queue.

The printing management program 203, when the printing of one document has been finished, checks the queue, and if there is present a printing control block linked to the queue, it starts the printing corresponding to this block.

Thus, it becomes possible to receive the printing requests in succession even in the course of printing by using an OS capable of multitask control, constructing the printing management program 203 and the printing conditions set up program 204 as individual tasks, controlling the process on the side of the user interface and that on the side of the printer separately, and defining a period by means of the queue.

Although an example of a printing process of a document has so far been described taking the case where a wire dot printer 103 is used as an example, the printing process is virtually the same if an LBP 104 is used. In the case with the LBP 104, the printing control program 206 does not execute the command issued from the printing program 201, but transfers it to the controller 210 of the LBP 104 through the LBP driver 209. Upon receipt of the command, the controller 210 spreads the print image for one page on a page memory (the page memory is not shown). The spread print image is read and printed by the LBP engine 211. The processing by the printing management program 203 and the printing program 201 is virtually the same whether the wire dot printer or the LBP 104 is used. It only differs in that, in the printing process with the LBP 104, the process of reading the image from the hard disk 101 and printing the same one line at a time is not required, but the printing management program 203 can issue the command for starting the printing to the printing control program 206 when the image spread on one page has been finished. The command to start the printing is transferred to the LBP controller 210 and this LBP controller 210 instructs the LBP engine 211 to start the printing.

Figure 9:
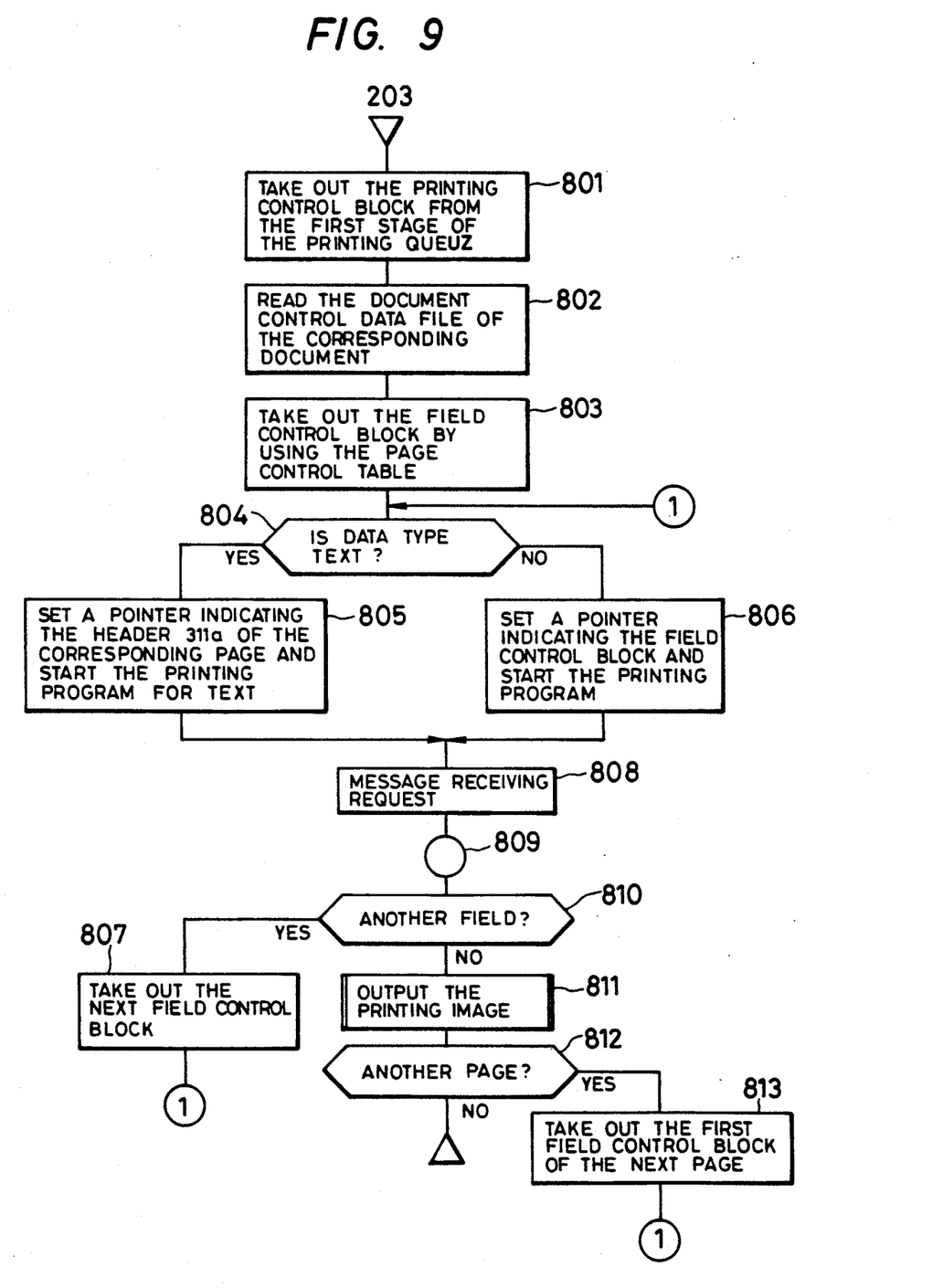
FIG. 9 is a flow chart showing an embodiment of the printing management program as shown in FIG. 2.
Figure 10:
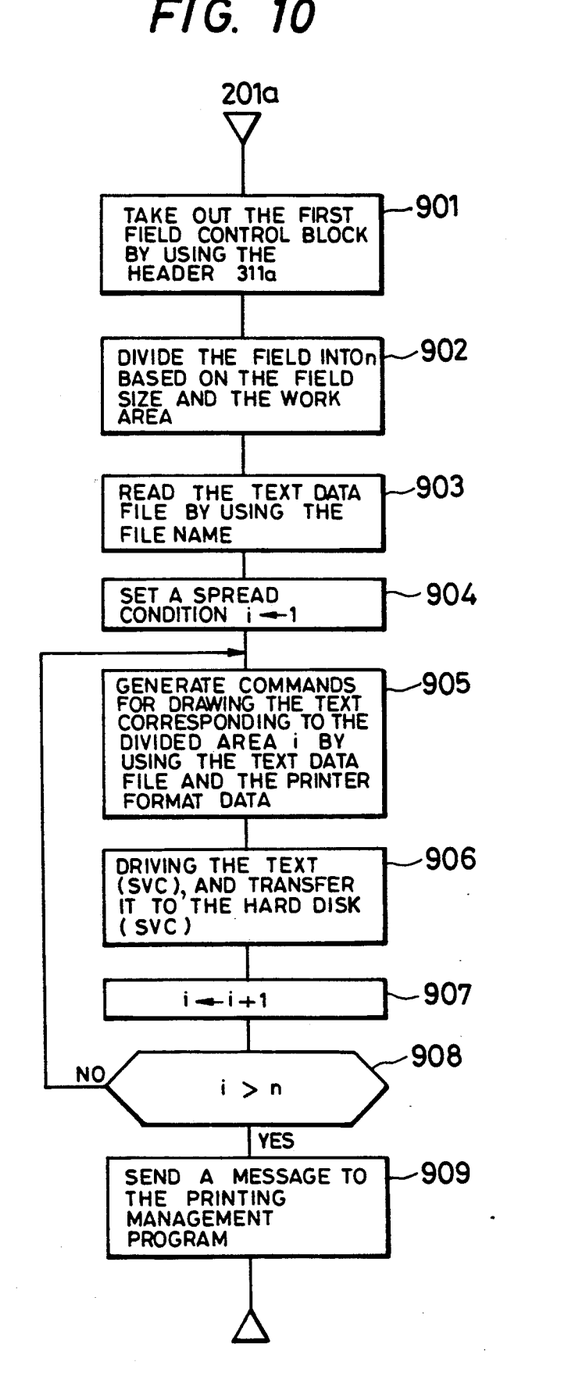
FIG. 10 is a flow chart showing an embodiment of the printing program shown in FIG. 2.

Now, detailed description on processing by the printing management program 203 and printing program 201 will be given with reference to FIGS. 5, 9, and 10. FIG. 9 shows the flow chart of the process performed by the printing management program 203 and FIG. 10 shows the flow chart of the process performed by the printing program 201. Referring to FIG. 9, the printing management program 203 takes out from the header 600 (FIG. 6) the printing control block 601 at the head of the printing queue (step 801), obtains the name of the document control data from the document file name 606 of the printing control block 601, and reads the corresponding document control data file 300 (step 802).

Then, the program reads the list header 311a of the field control block for the first page from the page control table 310 located in a predetermined position of the document control data file 300. When printing from the n-th page is designated according to the printing conditions, the list header for the n-th page is read. Since the entries in the page control table 310 are in the order of the page numbers and its length is fixed, it is easy to read out the list header for the required page. In step 803, the field control block 320a at the head of the field control block list is taken out. From the entry 324a in the block 320a, the field is known to be a text field. Thus, the program advances from the decision whether or not the data type is of text (step 804) to step 805. In this step 805, the address of the list header 311a is set in the register within the main CPU 100 and the printing program 201a for text is started. In this task starting macro, communication between the task requesting the start and the task to be started is performed through a register not shown within the main CPU 100. The printing management program 203, after starting the printing program 201a for text, issues a Message Receiving macro and comes to the waiting state for a message (steps 808, 809 in FIG. 9).

The started text printing program 201a takes out the first field control block 320a by using the field list header 311a as shown in step 901 of FIG. 10. In the present embodiment, it is assumed that there is only one text field in one page as shown in FIG. 5 and the corresponding field control block is positively at the head of the list. But it is apparent that the present invention will never be limited essentially by such assumption.

From the entries 321a and 322a in the field control block 320a, position and size of the field to be printed on the paper are known. The process will become easy if there is a work area of the same size as the field size or larger, but normally such a large work area is not available. Therefore, the field is divided into n divisions as shown in step 902 of FIG. 10, and the work area of the size of the divided field is used as an image buffer. The field data file for text 340a is read by using the file name in the entry 325a (step 903). The text printing program 201a, after setting the spread condition (step 904), generates commands for text rows to be spread by using the field data file for text 340a and the printer format data (step 905). Since the pointer 312a to the printer format data file 330a is known from the parameters at the start, the format data can be easily read out. In the field data file 340a, there are stored character codes and attribute data of the text, ruling data, etc. In the printer format data file 330a are stored data for margins, raw pitch, character pitch, etc.

The text printing program 201a spreads the print image for each divided field by SVC (step 906). The field finished with the spreading is transferred to the hard disk 101 by SVC (step 906). Although, in the present example, the printing control program 206 is arranged to transfer the field to the hard disk 101, the data necessary for such processing must be set by the printing program 201 (step 904 of FIG. 10). While the print image for one page 605 (FIG. 7) is stored in the hard disk 101, the printing program 201 controls the stored position using entries 321a, 322a, or data for division so that the image in the field is stored in the position corresponding to the field 410a in FIG. 5. After the image spreading process for one page has been finished through n times of looping of steps 905–907, a message is sent to the printing management program (step 909) and this sequence of process is ended.

The printing management program 203 upon receipt of the message restarts the processing from step 809 in FIG. 9. Because the link field 326a of the field control block 320a is indicating another field control block 320b, i.e., there still is another field in the same page, spreading of the print image on the field corresponding to the field control block 320b is carried out (steps 810, 807, 804, ...). The printing program for spreading the pattern on the field 410a as shown in FIG. 5 is started by the printing management program 203 (step 806), but description on the process relative to this pattern printing program will be omitted. When this step has been taken, the printing management program 203 in the waiting state for a message from the pattern printing program starts processing from step 809 again upon receipt of the message from the pattern printing program, when since the value of the link field 326b is NULL, printing process in step 811 is started according to decision in step 810. This process is such that the print image on the hard disk 101 is sliced and output to the wire dot printer 103 line by line 607 (FIG. 7). When the printing process is finished, next entry 311b (FIG. 4) of the page control table 310 is checked, and if it is significant, processing for that page is started, but if it is not significant (NULL value), the printing process is ended (step 812).

According to the present embodiment so far described, the following effects can be obtained.

(1) Documents in which text, patterns, graphs, etc. are integrated can be printed requiring virtually no need for altering the programs and data structures of the conventional applications.

(2) Although requests for printing were not received in the course of printing in the conventional system, the system of the present embodiment can receive new requests for printing documents in succession even in the course of printing, so that the operability for the user is much improved.

(3) When a new application is to be increased, it is achieved only by adding the special purpose printing program to this system, and therefore, documents with the data edited by the new application integrated therein can be printed.

According to the present invention, range of printing and order of printing on a page which are characteristic of the printing program of each application can be controlled by means of the document control table 300 and the printing management program 203, and therefore, printing of data edited by different applications on the same recording paper according to a predetermined layout, i.e., printing of a document, has been made possible.

Further, according to the present invention, the programs for printing (printing management program and printing program) and the printing conditions set up program 204, which sets up printing conditions through inquiry of the user about printing conditions, can be operated independently of each other, and therefore, acceptance of printing requests of other documents and establishment of the relative printing conditions are made possible in the present system even in the middle of its printing operation. As a result, better operability for the user is provided.

What is claimed is:

1. A processing system for printing documents provided with an operating system capable of multitask control, said processing system comprising:
   a plurality of printing programs, operating independently of one another, corresponding to editing programs, each of which edits either text, patterns, graphs or tables of a document, wherein each of said printing programs generates graphics commands according to edited data of said document edited by each of said editing programs;
   memory means for storing therein a plurality of edited data files independently having said edited data and a control data file having control data corresponding to said edited data, said control data indicating print position of said edited data of said document, data type of said edited data and data position of said edited data;
   printing management means for controlling the start of each of said plurality of printing programs in accordance with said data type included in said control data, wherein a started one of said plurality of printing programs generates said graphics commands in accordance with said print position and said edited data indicated by said data position; and
   printing control means for controlling a printing apparatus to generate a print image composed of dots in accordance with said graphics commands provided by said plurality of printing programs.

2. A processing system for printing documents according to claim 1, said system further comprising:
   printing conditions set up means for generating printing data about printing conditions; and
   a storage field for storing said printing data and being accessible by said printing management means and said printing conditions set up means.

3. A processing system for printing documents according to claim 2, wherein
   said storage field stores said printing data generated by said printing condition set up means.

4. A system for editing and printing documents, said system including at least one central processing unit (CPU), a main memory connected to said CPU for storing programs to be executed by said CPU, an external memory connected to said CPU for storing data, an input means connected to said CPU for inputting printing requests, and a printing means connected to said CPU for printing an image composed of dots, and said system being further provided with an operating system capable of multitask control, said editing and printing system comprising:
   a plurality of printing programs operating independently of one another, said printing programs being executed by said CPU for generating graphics commands using edited data or a document edited by said editing programs, each of said editing programs edits either text, patterns, graphs or tables of said document;
   a document control data file, formed on said main memory and including a page control table, for controlling pages for printing each of said edited data thereon, and field control blocks, each of said field control blocks corresponding respectively to said each edited data and including a field position, a data type, and data position on said external memory;
   a printing management program executed by said CPU for controlling the start of each of said plurality of printing programs in accordance with said data type included in said document control data file; and
   printing control means for controlling a printing apparatus to generate a print image composed of dots in accordance with said graphics commands from said plurality of printing programs.

5. A system for editing and printing documents according to claim 4, said system further comprising:
   a printing conditions set up program, executed by said CPU, for generating printing data, related to printing conditions in accordance with printing requests, independently of a printing process performed by said printing management program; and
   storage means for storing said printing data, said storage means being formed on a field on said main memory and being accessible by both said printing management program and said printing conditions set up program.

6. A system for editing and printing documents according to claim 5, wherein
   said printing data forms a queue arranged in the order in which said printing requests have been made.

7. A system for editing and printing documents according to claim 4, wherein
said printing control means includes a program which is a part of said operating system.

8. A printing system for editing and printing documents including printing means and a central processing unit (CPU), said printing system comprising:
a plurality of editing programs to be executed by said CPU, each of said editing programs being executed for producing edited data of a document, each kind of said edited data being text, pattern, graph or table of said document;
memory means for storing therein a plurality of edited data files for independently storing said edited data, and a control data file having print field positions, data types, and data stored positions of said edited data corresponding to all of said editing data files;
a plurality of printing programs to be executed by said CPU to generate a plurality of graphics commands in accordance with said print field positions and said edited data indicated by said data stored positions, said plurality of printing programs corresponding to each kind of said edited data;
a printing management program to be executed by said CPU for controlling the start of said plurality of printing programs in accordance with said data types included in said control data file; and
a printing control program to be executed by said CPU for controlling said printing means to generate a print image composed of dots in accordance with said plurality of said graphics commands generated from said plurality of printing programs.

9. A printing system according to claim 8, further comprising:
printing conditions set up programs to be executed by the CPU for generating a queue of printing control blocks including data stored positions of said control data file and printing conditions in response to print requests.

10. A printing system according to claim 9, wherein said memory means includes external memory means for temporarily storing said print image composed of dots before being printed by said printing means.

* * * * *